(12) United States Patent
Shima

(10) Patent No.: US 8,745,287 B2
(45) Date of Patent: Jun. 3, 2014

(54) DATA TRANSFER APPARATUS AND IMAGE FORMING SYSTEM

(75) Inventor: Tomohiro Shima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 86 days.

(21) Appl. No.: 13/484,608

(22) Filed: May 31, 2012

(65) Prior Publication Data

US 2013/0019033 A1    Jan. 17, 2013

(30) Foreign Application Priority Data

Jul. 15, 2011  (JP) .................................. 2011-157182

(51) Int. Cl.
*G06F 13/00*    (2006.01)
*G06F 3/00*     (2006.01)

(52) U.S. Cl.
USPC .................. 710/34; 710/33; 710/52; 710/53; 710/57

(58) Field of Classification Search
None
See application file for complete search history.

(56) References Cited

U.S. PATENT DOCUMENTS

| | | | |
|---|---|---|---|
| 7,702,841 B2 | 4/2010 | Shima | |
| 7,852,757 B1 * | 12/2010 | Puranik | 370/229 |
| 2006/0239194 A1 * | 10/2006 | Chapell | 370/235 |
| 2009/0248944 A1 | 10/2009 | Yap et al. | |
| 2011/0087820 A1 * | 4/2011 | Norden | 710/310 |
| 2011/0222111 A1 | 9/2011 | Shima | |
| 2011/0310446 A1 * | 12/2011 | Komatsu | 358/518 |

FOREIGN PATENT DOCUMENTS

| | | |
|---|---|---|
| EP | 1 722 547 A2 | 11/2006 |
| EP | 1 835 413 A1 | 9/2007 |
| JP | 2006-092286 | 4/2006 |
| WO | WO 2009/148432 A1 | 12/2009 |

OTHER PUBLICATIONS

Eugin Hyun et al: "The effective buffer architecture for data link layer of PCI express", Information Technology: Coding and Computing, 2004. Proceedings. ITCC 2004. International Conference on Las Vegas, NV, USA Apr. 5-7, 2004, Piscataway, NJ, USA, IEEE, vol. 1, Apr. 5, 2004, pp. 809-813.
Extended European search report dated Nov. 22, 2012.

* cited by examiner

*Primary Examiner* — Idriss N Alrobaye
*Assistant Examiner* — David Martinez
(74) *Attorney, Agent, or Firm* — IPUSA, PLLC

(57) ABSTRACT

A data transfer apparatus includes a virtual channel unit configured to time share a serial bus for a first virtual channel and a second virtual channel and include a buffering control unit configured to receive data via the first virtual channel and the second virtual channel, first and second receive buffers being configured to store the data received via the first virtual channel and the second virtual channel, respectively; and a switching unit configured to control storing the data received via the first virtual channel in the second receive buffer when the buffering control unit receives the data from another data transfer apparatus which is configured to use only the first virtual channel and the capacity of the first receive buffer is smaller than that of the second receive buffer.

6 Claims, 11 Drawing Sheets

FIG.4
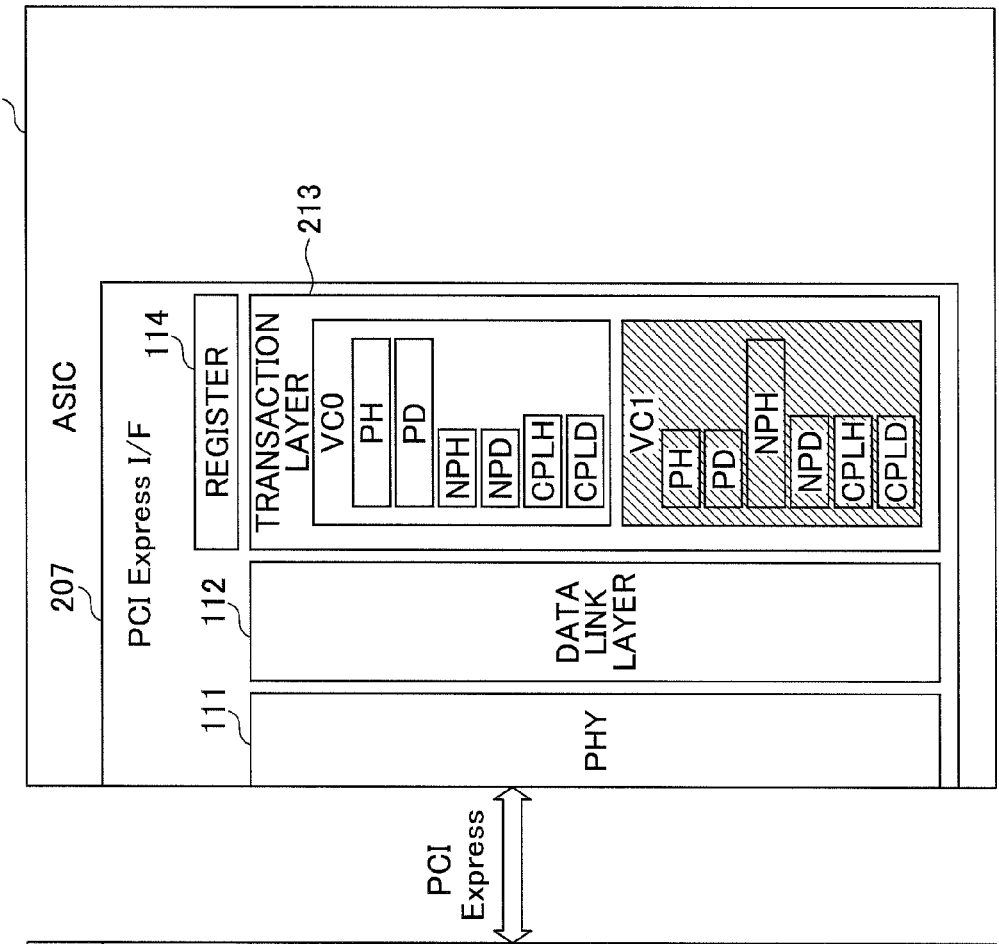
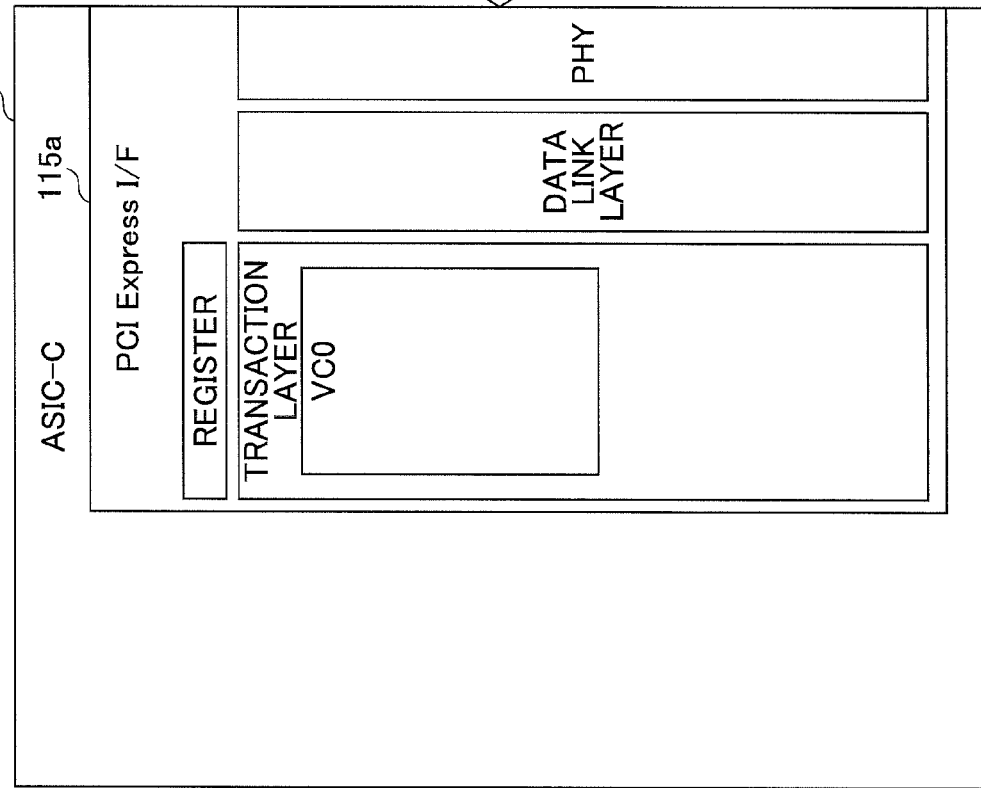

DATA TRANSFER APPARATUS AND IMAGE FORMING SYSTEM

BACKGROUND OF THE INVENTION

1. Field of the Invention

The present invention relates to a data transfer apparatus and an image forming system.

2. Description of the Related Art

Recently, a high speed serial transmission line, whose transmission speed exceeds several Gbps, capable of transmitting data much faster than Ethernet (registered trademark) has been actualized. For this kind of transmission line, a standard of a local In/Out (I/O) adopting a communication method similar to a conventional computer network has been spreading. Thus, a data network for communications within a chip, between chips or between boards of a Large Scale Integration (LSI) by packet communication using a serial transmission line and a switch, similar to the computer network, is becoming to be used in an electric device to be embedded in a system.

Specifically, for a system such as a Personal Computer (PC) system, an embedded system such as an image forming apparatus such as a Multi Function Peripheral (hereinafter, simply referred to as a "MFP") or the like, a high speed serial communication standard so-called Peripheral Component Interconnect Express (PCI Express (registered trademark) hereinafter, simply referred to as a "PCIe" as well) has been used for transmitting mass data within an apparatus.

The merit for using the PCIe, which is the high speed serial communication standard, is that it is only necessary to increase the number of lanes in order to spread band so that it is flexible in increasing and decreasing the band compared with the conventional PCI, which is a parallel communication standard. Further, by using the PCIe, the number of the terminals for the LSI and the number of interconnects on a board can be reduced. Further, as the components for the PCIe are mass produced for PCs, the cost for the components is relatively low.

(Virtual Channel)

For a data transfer system in which plural data transfer apparatuses are connected with each other via a common channel for transferring data, if traffic streams of different kinds are transferred through the same channel, there may be a conflict. When such a conflict occurs, the communication qualities (data transfer rate, continuity or the like) for the traffic streams may not be maintained. Thus, an algorithm of arbitration for a serial interface of the PCIe includes a virtual channel function in which a serial bus is time shared by plural virtual channels so that packet data of the plural traffic streams are separately transferred, and an arbitration function in which priority in issuing packet data is arbitrated for each of the virtual channels. The virtual channel is simply referred to as a "VC" as well, hereinafter. With this, Quality of Service (QoS) is actualized. In the data transfer apparatus that includes such an algorithm, packet data is transferred while the order of transferring the data is adjusted for each of the transactions when the packet data of the plural traffic streams corresponding to the plural virtual channels whose priorities are different are to be transferred by the serial bus at the same time (see Patent Document 1).

For the data transfer apparatus which is to be embedded in a system such an image forming apparatus such as a MFP, the capacities of buffers of the plural virtual channels are respectively optimized corresponding to the kinds of transactions in accordance with the purpose of the system.

Therefore, as will be explained later in detail, there is a problem when it is necessary for the data transfer apparatus to communicate with another data transfer apparatus which is not configured to form plural virtual channels corresponding to those of the data transfer apparatus, that throughput in transferring data of some kinds of transactions via a virtual channel is lowered.

PATENT DOCUMENT

[Patent Document 1] Japanese Laid-open Patent Publication No. 2006-92286

SUMMARY OF THE INVENTION

The present invention is made in light of the above problems, and provides a data transfer apparatus and an image forming system capable of improving throughput in transferring data via a virtual channel with another data transfer apparatus, without increasing cost or power consumption regardless of the kind of the other data transfer apparatus.

According to an embodiment, there is provided a data transfer apparatus including a virtual channel unit configured to time share a serial bus for a first virtual channel of a first kind and a second virtual channel of a second kind and include a buffering control unit configured to receive data via the first virtual channel and the second virtual channel, a first receive buffer configured to store the data received via the first virtual channel, a second receive buffer configured to store the data received via the second virtual channel, and a switching unit configured to control storing the data received via the first virtual channel in the second receive buffer when the buffering control unit receives the data from another data transfer apparatus which is configured to use only the first virtual channel and the capacity of the first receive buffer provided to store the data is smaller than the capacity of the second receive buffer provided to store the data.

According to another embodiment, there is provided an image forming system including an image input engine; an image output engine; and a controller that controls the image input engine and the image output engine, the controller including the above data transfer apparatus and connects the image input engine and the image output engine.

According to another embodiment, there is provided a data transfer apparatus including a virtual channel unit configured to time share a serial bus for a first virtual channel and a second virtual channel and include a buffering control unit configured to send data via the first virtual channel and the second virtual channel, a first send buffer configured to store the data to be sent via the first virtual channel, a second send buffer configured to store the data to be sent via the second virtual channel, and a switching unit configured to control storing the data to be sent via the first virtual channel in the second send buffer when the buffering control unit sends the data to another data transfer apparatus which is configured to use only the first virtual channel and the capacity of the first send buffer provided to store the data is smaller than the capacity of the second send buffer provided to store the data.

Note that also arbitrary combinations of the above-described constituents, and any exchanges of expressions in the present invention, made among method, device, system, recording medium, computer program and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 4 is a block diagram showing an example of a controller-side ASIC including a PCI Express I/F;

DETAILED DESCRIPTION OF THE PREFERRED EMBODIMENTS

Before describing the present invention, the related art will be explained in detail with reference to FIG. 11 in order to facilitate the understanding of the present invention.

Here, an example is explained where a data transfer apparatus capable of transferring data by PCI Express is applied to a MFP.

Figure 11:
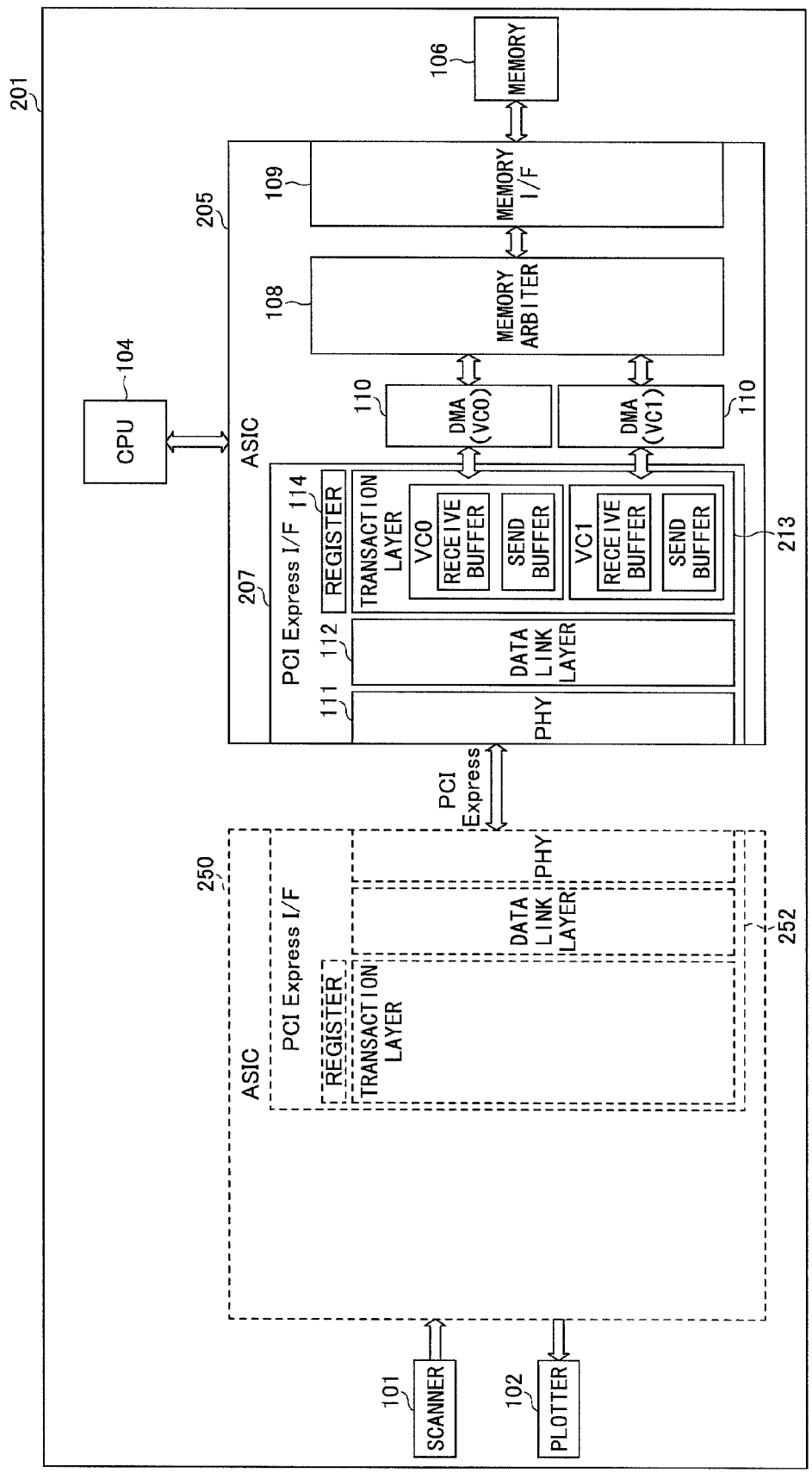
FIG. 11 is a block diagram showing an example of a structure of a PCI Express system which is embedded in a MFP.

FIG. 11 is a block diagram showing an example of a structure of a PCI Express system which is embedded in a MFP 201.

The MFP 201 includes a scanner 101, a plotter 102, a CPU 104, a memory 106, a controller-side Application Specific Integrated Circuit (ASIC) 205 and an opposite ASIC 250.

The controller-side ASIC 205 includes a PCI Express I/F 207, a memory arbiter 108, a memory I/F 109 and a direct memory access (DMA) 110. The PCI Express I/F 207 includes a physical layer (shown as "PHY") 111, a data link layer 112, a transaction layer 213 and a register 114.

The PCI Express I/F 207 of the controller-side ASIC 205 is configured to form plural virtual channels, a first virtual channel VC0 of a first kind and a second virtual channel VC1 of a second kind. The transaction layer 213 of the PCI Express I/F 207 includes a receive buffer and a send buffer (flow control buffers) respectively for the first virtual channel VC0 and the second virtual channel VC1, which are made of a Static Random Access Memory (SRAM) or the like.

The opposite ASIC 250 includes a PCI Express I/F 252 including a physical layer, a data link layer, a transaction layer and a register.

(Flow Control)

For a communication method using the PCI Express, transferring of data is controlled by a flow control in which the flow of the data between data transfer apparatuses connected by a PCI Express link is controlled by credit information. The sender-side data transfer apparatus has a function to confirm the vacant (available) capacity of the corresponding buffer of the receiver-side data transfer apparatus before transferring the data in order to prevent overflow or underflow of the data.

Further, the sender-side data transfer apparatus has a function (reporting unit) to report the confirmed vacant capacity to the sender-side.

Specifically, when initiating the PCI Express link, upon receiving a request from the sender-side, the receiver-side data transfer apparatus sends (reports) credit information (including a credit value) indicating the vacant capacity of the buffer formed in the transaction layer and corresponding to the kind of the request such as a memory write request, a memory read request or the like, to the sender-side data transfer apparatus. This credit information is sent by a control packet so called a data link layer packet/DLLP (Init FC).

The sender-side data transfer apparatus sends the data (packets) only when the receiver-side data transfer apparatus has a sufficient vacant capacity for the corresponding buffer. When the sender-side data transfer apparatus sends the data, the sender-side data transfer apparatus subtracts the size of the currently sent data (packets) from the received credit value. When the credit value of the receiver-side data transfer apparatus becomes zero, the sender-side data transfer apparatus suspends the operation of sending the data. At this time, the receiver-side data transfer apparatus sends the vacant capacity of the corresponding buffer (additional credit value) every time the transferring of the received data is completed, to the sender-side data transfer apparatus by the DLLP (Update FC). Then, the sender-side data transfer apparatus becomes capable of issuing and sending a new request (data) corresponding to the vacant capacity of the corresponding buffer of the receiver-side data transfer apparatus.

By the above described flow control based on the credit information, the sender-side data transfer apparatus is prevented from sending the data which exceeds the vacant capacity of the corresponding buffer of the receiver-side data transfer apparatus. Thus, it is not necessary to re-send the data so that the efficiency in transferring the data can be improved.

Further, for the controller-side ASIC 205, as the PCI Express I/F 207 is configured to form the plural virtual channels, the first virtual channel VC0 and the second virtual channel VC1, the flow control is performed for each of the first virtual channel VC0 and the second virtual channel VC1.

Therefore, referring to the receive buffer, the receive buffers are formed for each of the first virtual channel VC0 and the second virtual channel VC1. Further, each of the receive buffers of the first virtual channel VC0 and the second virtual channel VC1 is further divided into plural receive buffers corresponding to the kinds of transactions supposed to flow through the corresponding virtual channels. The kinds of transactions include a "posted transaction", a "non-posted transaction", "completions" or the like. Among these, the receive buffer for the "posted transaction" mainly buffers the memory write request for writing data in the memory 106. Further, the receive buffer for the "non-posted transaction" mainly buffers the memory read request for reading data from the memory 106.

(Embodiment in an Apparatus)

As described above, for the system such as the MFP, the PCI Express is used for transferring a large amount of data. When adapting the PCI Express in the MFP 201, for example, the PCI Express I/F 207 of the controller-side ASIC 205 is configured such that a transaction related to an input from the scanner 101 is transferred by the first virtual channel VC0 and a transaction related to an output by the plotter 102 is transferred by the second virtual channel VC1. Here, the second virtual channel VC1 is given priority in arbitration.

The reason for giving priority to the second virtual channel VC1 is that the packets for the transaction related to the output by the plotter 102 are just the memory read request and do not include actual data. Thus, even if priority is given, the packets of the memory read request do not influence transferring of the packets of the transaction related to the input by the scanner 101. On the other hand, the packets for the transaction related to the input by the scanner 101 include actual data and the sender-side transmission line is used for a long time for sending the packets for the transaction related to the input by the scanner 101. Thus, if priority is given to the transaction related to the input by the scanner 101, the sender-side transmission line is occupied by the packets for the transaction related to the input by the scanner 101. In such a case, the transaction related to the output by the plotter 102 cannot be performed easily so as to reduce the using efficiency of the receiver-side transmission line.

Further, for the MFP 201, the kinds of transactions to be performed are pre-determined for the first virtual channel VC0 and the second virtual channel VC1. Thus, the receive buffers in the PCI Express I/F 207 corresponding to the kinds of transactions for each of the first virtual channel VC0 of the first kind and the second virtual channel VC1 of the second kind are designed to be optimized to have different capacities based on the pre-determined kinds of transactions. With this structure, the capacity of the buffer can be efficiently used while reducing the cost for the semiconductor integrated circuit and also reducing the power consumption.

For example, for the MFP 201, as described above, the transaction related to the input by the scanner 101 is transferred via the first virtual channel VC0 of the first kind. Thus, the receive buffer of the first virtual channel VC0 of the PCI Express I/F 207 mainly receives the memory write request for writing data scanned by the scanner 101 in the memory 106, sent from the scanner 101. Therefore, for the first virtual channel VC0, the capacity of the receive, buffer for the "posted transaction" is set larger. On the other hand, as the first virtual channel VC0 does not receive the memory read request for reading data from the memory 106, sent from the scanner 101, the receive buffer for the "non-posted transaction" is set as small as possible (or almost not included) for the first virtual channel VC0.

Further, the transaction related to the output by the plotter 102 is transferred via the second virtual channel VC1 of the second kind. Thus, the receive buffer of the second virtual channel VC1 of the PCI Express I/F 207 mainly receives the memory read request sent from the plotter 102. Therefore, for the second virtual channel VC1, the capacity of the receive buffer for the "non-posted transaction" is set to be larger. On the other hand, as the second virtual channel VC1 does not receive the memory write request sent from the plotter 102, the receive buffer for the "posted transaction" is set to be as small as possible (or almost not included) for the second virtual channel VC1.

However, when the capacities of the buffers of the PCI Express I/F 207 of the controller-side ASIC 205 are optimized as described above, if the PCI Express I/F 252 of the opposite ASIC 250 is configured to form only the first virtual channel VC0, there may be a following problem.

Specifically, although the PCI Express I/F 207 of the controller-side ASIC 205 is configured to form the two kinds of virtual channels, the first virtual channel VC0 and the second virtual channel VC1, when the PCI Express I/F 252 of the opposite ASIC 250 is configured to form only the first virtual channel VC0, all of the data are transferred via the first virtual channel VC0.

However, as described above, the receive buffers of the PCI Express I/F 207 of the controller-side ASIC 205 are optimized for the first virtual channel VC0 and the second virtual channel VC1. Specifically, the receive buffer for the "posted transaction" is set larger while the receive buffer for the "non-posted transaction" is set as small as possible for the first virtual channel VC0 of the controller-side ASIC 205. Thus, when the data is transferred from the PCI Express I/F 252 of the opposite ASIC 250 configured to form only the first virtual channel VC0, only the first virtual channel VC0 is used. In this case, for the memory write request, as the capacity of the receive buffer for the "posted transaction" of the first virtual channel VC0 of the controller-side ASIC 205 is set larger, there is no problem.

However, for the memory read request, as the capacity of the receive buffer for the "non-posted transaction" of the first virtual channel VC0 of the controller-side ASIC 205 is set as small as possible, it is difficult to receive a large amount of the packets of the memory read request in the receive buffer for the "non-posted transaction" of the first virtual channel VC0. Thus, the issuing of the "non-posted transaction" is suspended by the flow control operation so that the band of the PCI Express is reduced.

By providing SRAM with a larger capacity for the first virtual channel VC0 in the controller-side ASIC 205 and setting the capacities of the receive buffers sufficiently, the band of the PCI Express may not be reduced even when the PCI Express I/F 252 of the opposite ASIC 250 is configured to form only the first virtual channel VC0. However, in this case, cost and power consumption of the semiconductor integrated circuit are increased. Further, as the throughput of the PCI Express I/F is improving rapidly, it is necessary to increase the capacity of the buffer (receive buffer) in accordance with the increasing of the throughput. Thus, it is difficult to further increase the capacity of the buffer for having the capacities of all of the buffers.

The same problem can be raised for the send buffer.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

In the following, an example is explained where a data transfer apparatus capable of transferring data by the PCI Express is applied to a MFP (an example of an image forming system).

First Embodiment

System Structure

Figure 1:
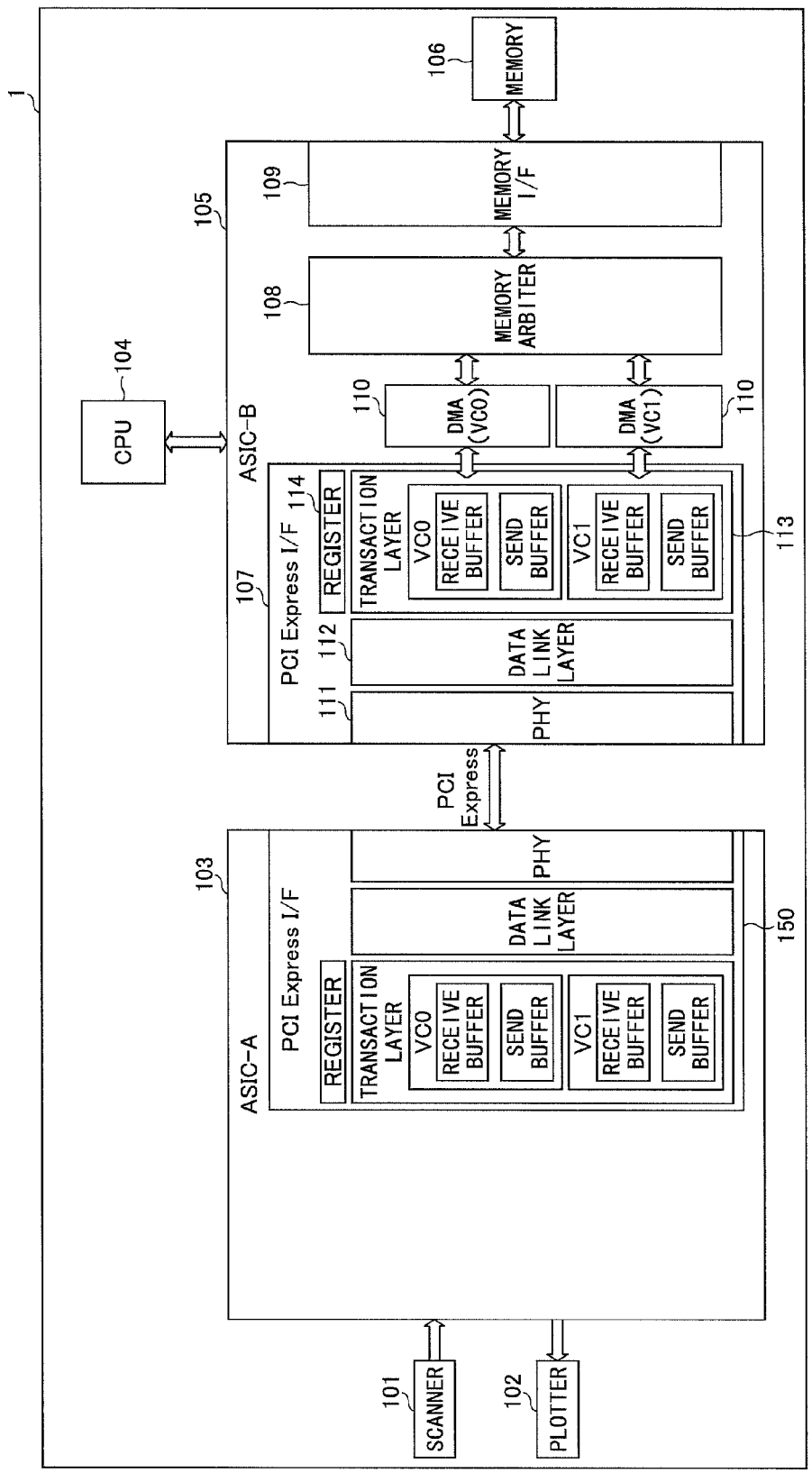
FIG. 1 is a block diagram showing an example of a structure of a PCI Express system of an embodiment.

FIG. 1 is a block diagram showing an example of a structure of a PCI Express system of the embodiment which is embedded in a MFP 1 as an example of an embedded system.

The MFP 1 of the embodiment includes a scanner 101, a plotter 102, a CPU 104, a memory 106, a controller-side ASIC-B 105 and an opposite ASIC. In FIG. 1, an example where the opposite ASIC is an opposite ASIC-A 103 is shown.

The scanner 101 corresponds to an image reading unit that optically reads a document set at a reading surface of the MFP 1 to form image data. In other words, the scanner 101 is an example of an image input engine. The image data is input by the scanner 101 to be stored (written) in the memory 106.

The plotter 102 corresponds to an image writing unit that prints a bitmap image of image data read from the memory 106 on a paper or the like by an electro-photographic process, for example. In other words, the plotter 102 is an example of an image output engine.

The controller-side ASIC-B 105 composes a controller of the MFP 1 with the CPU 104 and the memory 106. It means that under control of the CPU 104, the image data read by the scanner 101 is stored in the memory 106 via the controller-side ASIC-B 105 of the controller. Further, image data stored in the memory 106 is read via the controller-side ASIC-B 105 and sent to the plotter 102.

The controller-side ASIC-B 105 includes a PCI Express I/F (circuit) 107 (which is an example of a virtual channel unit). Similarly, the opposite ASIC-A 103 includes a PCI Express I/F 150.

The controller-side ASIC-B 105 and the opposite ASIC-A 103 are connected with each other by a serial bus via the PCI Express I/F 107 and the PCI Express I/F 150. Thus, the controller-side ASIC-B 105 and the opposite ASIC-A 103 function as data transfer apparatuses, respectively.

The opposite ASIC-A 103 functions as a PCI Express switch which is used for connecting the controller (the controller-side ASIC-B 105, the CPU 104, the memory 106 and the like), and the scanner 101 and the plotter 102.

In addition to the PCI Express I/F 107, the controller-side ASIC-B 105 includes a memory arbiter 108, a memory I/F 109 and a direct memory access (DMA) 110. The PCI Express I/F 107 includes a physical layer (shown as "PHY") 111, a data link layer 112, a transaction layer 113 and a register 114. The register 114 is a VC resource control register which is defined by the PCI Express standard.

Further, in the MFP 1 of the embodiment, the PCI Express I/F 107 of the controller-side ASIC-B 105 is configured to form two virtual channels including a first virtual channel VC0 of a first kind and a second virtual channel VC1 of a second kind. Each of the first virtual channel VC0 and the second virtual channel VC1 includes a receive buffer and a send buffer. Thus, the PCI Express I/F 107 includes a receive buffer for VC0, a receive buffer for VC1, a send buffer for VC0 and a send buffer for VC1, which will be explained later in detail with reference to FIG. 2.

For the opposite ASIC-A 103 shown in FIG. 1, similar to the controller-side ASIC-B 105, the PCI Express I/F 150, which opposes the PCI Express I/F 107, is configured to form two virtual channels including the first virtual channel VC0 and the second virtual channel VC1.

Figure 2:
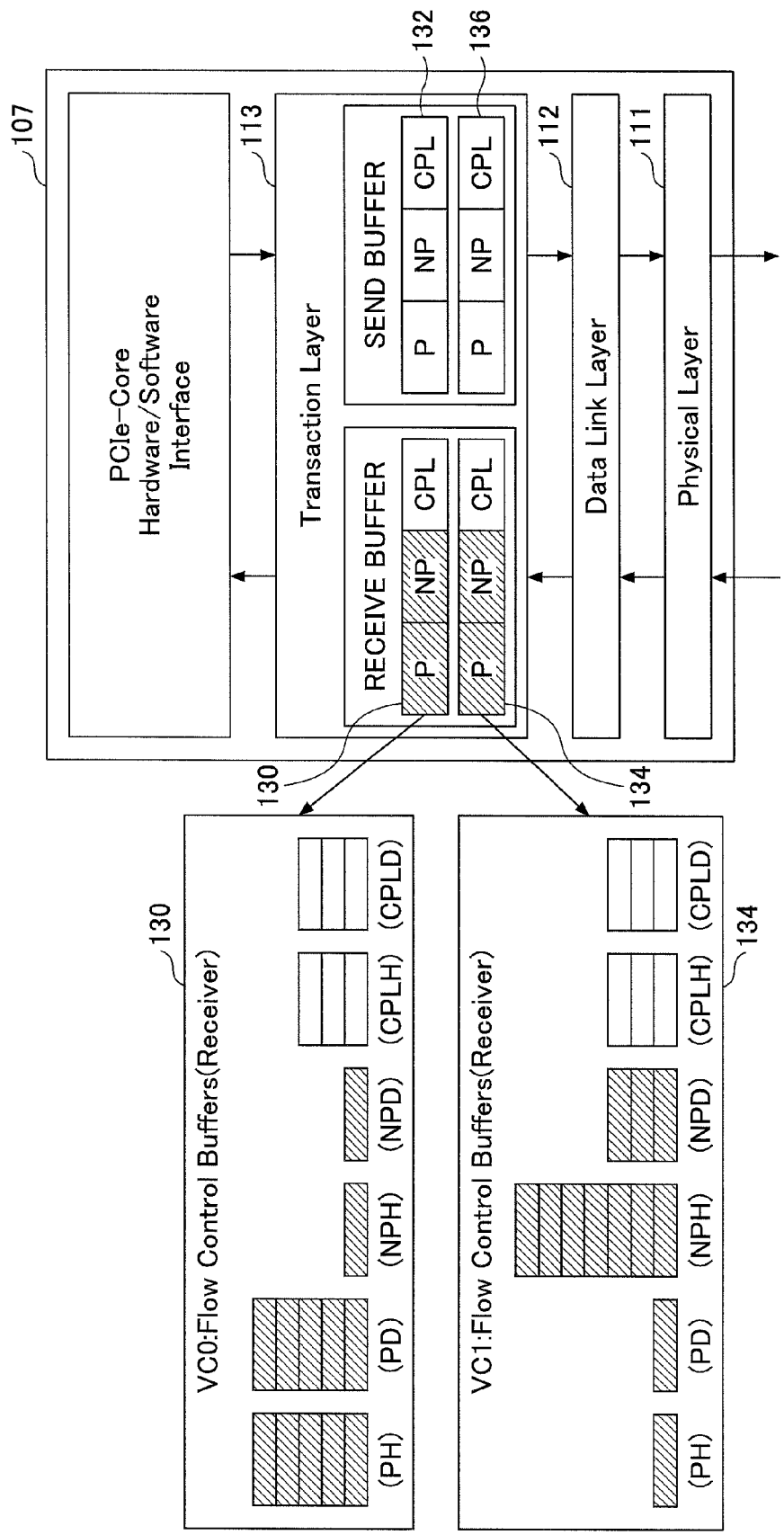
FIG. 2 is a schematic view showing an example of architecture of a PCI Express I/F of a controller-side ASIC of an embodiment.

FIG. 2 is a schematic view showing an example of architecture of the PCI Express I/F 107 of the embodiment.

The PCI Express I/F 107 includes the transaction layer 113, the data link layer 112 and the physical layer 111 which become the center of the architecture of the PCI Express and function as a PCI Express communication unit that performs data communications by the PCI Express.

The transaction layer 113 is configured to include receive buffers (flow control buffers) and send buffers (transmit buffers) which are actualized by static random access memory (SRAM) or the like. As described above, the receive buffers and the send buffers are formed for each of the first virtual channel VC0 and the second virtual channel VC1. Thus, the transaction layer 113 is configured to include a receive buffer for VC0 130, a receive buffer for VC1 134, a send buffer for VC0 132 and a send buffer for VC1 136.

Further, as described above, the receive buffer and the send buffer are respectively formed for each of the kinds of transactions which are supposed to flow through the virtual channels. In this embodiment, the transactions include "posted transaction", "non-posted transaction", "completions" or the like. The receive buffer for the "posted transaction" mainly buffers the memory write request for writing data in the memory 106, and the receive buffer for the "non-posted transaction" mainly buffers a memory read request for reading the data from the memory 106. Further, as data is transferred as packet data in the data communication by the PCI Express, each of the buffers is further formed to include a header portion for buffering a header including packet information or the like, and a data portion for buffering a payload of the packet.

Thus, each of the receive buffer for VC0 130, the receive buffer for VC1 134, the send buffer for VC0 132 and the send buffer for VC1 136 includes the following six buffers.

"PH": Posted Header
"PD": Posted Data
"NPH": Non-Posted Header
"NPD": Non-Posted Data
"CPL": Completion Header
"CPD": Completion Data In FIG. 2, the contents of the receive buffer for VC0 130 and the receive buffer for VC1 134 are shown in detail. The contents of the send buffers will be explained in the second embodiment.

Referring to the content of the receive buffer for VC0 130, the receive buffers for the "posted transaction" ("PH" and "PD") have a larger capacity than those of the receive buffers for the "non-posted transaction" ("NPH" and "NPD"), respectively. For the MFP 1, as described above, the first virtual channel VC0 is adapted for the transaction related to an input by the scanner 101. Thus, the receive buffer for VC0 130 of the PCI Express I/F 107 mainly receives the memory write request for writing the data scanned by the scanner 101 in the memory 106, sent from the scanner 101. Therefore, the first virtual channel VC0 is configured to have a larger capacity for the receive buffer for the "posted transaction".

On the other hand, as the scanner 110 does not send the memory read request for reading the data in the memory 106, the first virtual channel VC0 does not receive the memory read request from the scanner 110. Thus, the first virtual channel VC0 is configured to have the capacity of the receive buffer for the "non-posted transaction" as small as possible (or almost not to include the receive buffer for the "non-posted transaction"). Specifically, when the total capacity of the SRAM for the receive buffer for VC0 130 is 18 frame blocks, the receive buffers for the "posted transaction" (including "PH" and "PD") include 10 frame blocks while the receive buffers for the "non-posted transaction" (including "NPH" and "NPD") include two frame blocks in this example.

Further, referring to the content of the receive buffer for VC1 134, the receive buffers for the "non-posted transaction" ("NPH" and "NPD") have a larger capacity than those of the receive buffers for the "posted transaction" ("PH" and "PD"), respectively. As described above, the second virtual channel VC1 is adapted for the transaction related to an output by the plotter 102. Thus, the receive buffer of the second virtual channel VC1 of the PCI Express I/F 107 mainly receives the memory read request for reading the data in the memory 106, sent from the plotter 102. Therefore, the second virtual channel VC1 is configured to have a larger capacity for the "non-posted transaction".

On the other hand, as the plotter 102 does not send the memory write request for writing the data in the memory 106, the second virtual channel VC1 does not receive the memory write request from the plotter 102. Thus, the second virtual channel VC1 is configured to have the capacity of the receive buffer for the "posted transaction" as small as possible (or almost not to include the receive buffer for the "posted transaction"). Specifically, when the total capacity of the SRAM for the receive buffer for VC1 134 is 18 frame blocks, the receive buffers for the "non-posted transaction" (including "NPH" and "NPD") include 10 frame blocks while the receive buffers for the "posted transaction" (including "PH" and "PD") include two frame blocks in this example. Here, for the memory read request, the packets include a very small amount of the payload, so that the capacity for the header portion "NPH" is set larger.

Referring back to FIG. 1, when the opposite ASIC-A 103 becomes a sender and the controller-side ASIC-B 105 becomes a receiver, the flow control between the opposite ASIC-A 103 and the controller-side ASIC-B 105 when seen from the controller-side ASIC-B 105, which is the receiver, is as follows.

For example, upon receiving the memory write request from the scanner 101 when initiating the link for the first virtual channels VC0, the controller-side ASIC-B 105 sends credit information (including a credit value) indicating the amount of data capable of being received, to the opposite ASIC-A 103 by a DLLP (Init FC). Here, the credit value sent to the opposite ASIC-A 103 corresponds to the vacant capacity of the receive buffer for the "posted transaction" ("PH" and "PD") of the receive buffer for VC0 130 (see FIG. 2) of the controller-side ASIC-B 105.

In this embodiment, as described above, the receive buffer for VC0 130, in other words, the receive buffer for the "posted transaction" of the receive buffer for VC0 130 has the capacity sufficient enough for the memory write request sent from the scanner 101.

Further, for example, upon receiving the memory read request from the plotter 102 when initiating the link for the second virtual channels VC1, the controller-side ASIC-B 105 sends credit information (including a credit value) indicating the amount of the data capable of being received, to the opposite ASIC-A 103 by a DLLP (Init FC). Here, the credit value sent to the opposite ASIC-A 103 corresponds to the vacant capacity of the receive buffer for the "non-posted transaction" ("NPH" and "NPD") of the receive buffer for VC1 134 (see FIG. 2) of the controller-side ASIC-B 105.

In this embodiment, as described above, the receive buffer for VC1 134, in other words, the receive buffer for the "non-posted transaction" of the receive buffer for VC1 134 has the capacity sufficient enough for the memory read request sent from the plotter 102.

Here, on the other hand, when the opposite ASIC-A 103 becomes the receiver and the controller-side ASIC-B 105 becomes the sender, the flow control between the opposite ASIC-A 103 and the controller-side ASIC-B 105 when seen from the controller-side ASIC-B 105, which is the sender, is as follows.

For example, when initiating the link for the first virtual channels VC0, after sending a request, the controller-side ASIC-B 105 receives credit information from the opposite ASIC-A 103 in accordance with the kind of transaction. The controller-side ASIC-B 105 sends data (packets) to the opposite ASIC-A 103 in accordance with the kind of transaction via the send buffer only when the corresponding receive buffer of the opposite ASIC-A 103 has a sufficient vacant capacity based on the received credit information. Then, the controller-side ASIC-B 105 subtracts the size of the currently sent data from the received credit value. When the credit value of the opposite ASIC-A 103 becomes zero, the controller-side ASIC-B 105 suspends the operation of sending the data. At this time, the opposite ASIC-A 103 sends the amount of the data capable of being received (additional credit value) every time the transferring of the received data is completed, to the controller-side ASIC-B 105 by the DLLP (Update FC). Then, the controller-side ASIC-B 105 becomes capable of issuing and sending new data corresponding to the amount which can be received by the opposite ASIC-A 103.

Figure 3:
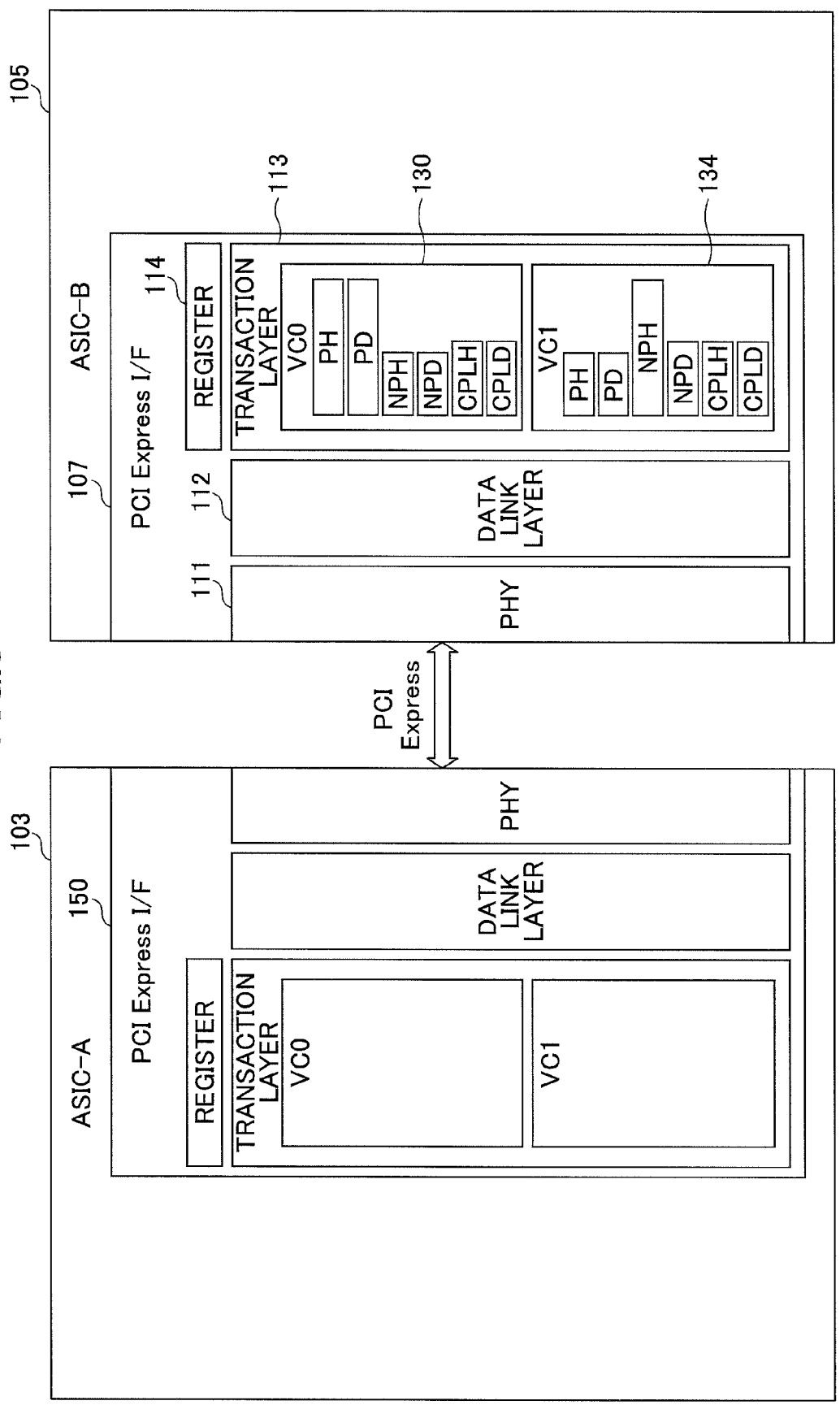
FIG. 3 is a block diagram showing an example of the PCI Express I/F of the controller-side ASIC of an embodiment.

FIG. 3 is a block diagram showing an example of the PCI Express I/F 107 of the controller-side ASIC-B 105 of the embodiment. FIG. 3 is a combination of the structures shown in FIG. 1 and FIG. 2. In FIG. 3, the receive buffer for VC0 130 and the receive buffer for VC1 134 in the transaction layer 113 of the PCI Express I/F 107 of the controller-side ASIC-B 105 are shown (the send buffers are not shown in FIG. 3).

As described above, the controller-side ASIC-B 105 includes a sufficient amount of capacity of the receive buffer for the "posted transaction" in the receive buffer for VC0 130 to correspond to the memory write request supposed to be sent from the scanner 101, as the receiver.

Further, the controller-side ASIC-B 105 includes a sufficient amount of capacity of the receive buffer for the "non-posted transaction" in the receive buffer for VC1 134 to correspond to the memory read request supposed to be sent from the plotter 102, as the receiver.

(For an Opposite ASIC-C 115 Including Only the First Virtual Channel VC0)

FIG. 4 is a block diagram showing an example of an MFP 201 including a controller-side ASIC 205 including a PCI Express I/F 207 and an opposite ASIC-C 115. Here, an example where the opposite ASIC 250 shown in FIG. 11 is the opposite ASIC-C 115 is shown. The opposite ASIC-C 115 includes a PCI Express I/F 115a which opposes the PCI Express I/F 207 of the controller-side ASIC 205. The PCI Express I/F 115a is configured to form a single virtual channel composed of the first virtual channel VC0.

As for the PCI Express, the data transfer apparatuses are connected by the maximum number of the virtual channels which are supported by both of the data transfer apparatuses. Thus, in this case, the controller-side ASIC 205 and the opposite ASIC-C 115 are connected only by the first virtual channel VC0. It means that the receive buffer for VC1 (the parts shown by the hatched lines) is not used in this example. However, as described above, the receive buffer for the "non-posted transaction" ("NPH" and "NPD") for the controller-side ASIC 205 is very small (or almost not included). Thus, the receive buffer for the "non-posted transaction" of the controller-side ASIC 205 easily becomes full so that the opposite ASIC-C 115 cannot issue the next memory read request until the receive buffer for the "non-posted transaction" of the controller-side ASIC 205 becomes vacant. This is because the credit value of the credit information sent from the controller-side ASIC 205 to the opposite ASIC-C 115 in the flow control is small and the credit value easily becomes zero. At this time, the throughput between the opposite ASIC-C 115 and the controller-side ASIC 205 becomes extremely low so that an abnormal image formation may be performed in the MFP 201, for example.

(PCI Express I/F 107 of the Controller-Side ASIC-B 105)

Figure 5:
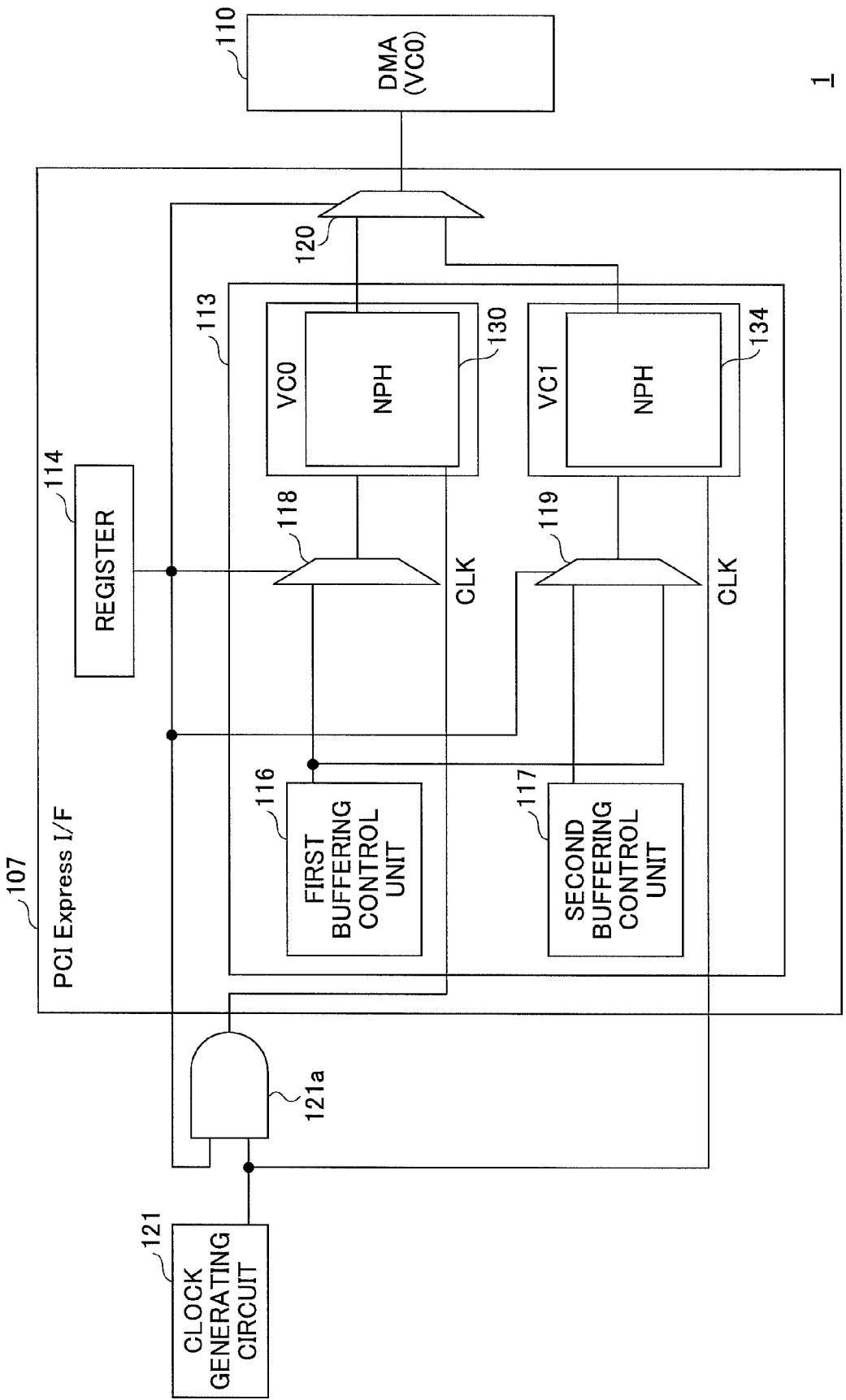
FIG. 5 is a circuit diagram of the PCI Express I/F of an embodiment.

FIG. 5 is a circuit diagram of the PCI Express I/F 107 of the controller-side ASIC-B 105 of the embodiment. The PCI Express I/F 107 of the embodiment is configured to have the following function for suppressing the lowering of the throughput even when the opposite ASIC-C 115 including only the first virtual channel VC0 is connected to the controller-side ASIC-B 105.

As explained above with reference to FIG. 1 to FIG. 3, the first virtual channel VC0 and the second virtual channel VC1 of the transaction layer 113 respectively include the receive buffer for the "non-posted transaction" "NPH" (only "NPH" is shown in FIG. 5 for explanation).

Further, the transaction layer 113 includes a first buffering control unit for VC0 116 (which is an example of a buffering control unit), a second buffering control unit for VC1 117 (which is also an example of a buffering control unit), a selector 118 and a selector 119.

The first buffering control unit for VC0 116 is configured to write data in the receive buffer for VC0 130 of the first virtual channel VC0. In this embodiment, the first buffering control unit for VC0 116 is connected to the receive buffers "NPH" of the first virtual channel VC0 and the second virtual channel VC1 via the selector 118 and the selector 119, respectively. Thus, the first buffering control unit for VC0 116 is configured to be capable of writing data in the receive buffers "NPH" of the first virtual channel VC0 and the second virtual channel VC1.

The second buffering control unit for VC1 117 is configured to write data in the receive buffer for VC1 134 of the second virtual channel VC1. The second buffering control unit for VC1 117 is connected to the receive buffer "NPH" of the second virtual channel VC1 via the selector 119. The receive buffers "NPH" of the first virtual channel VC0 and the second virtual channel VC1 are connected to the DMA (VC0) 110 via the selector 120. Although not shown in FIG. 5, the receive buffer "NPH" of the second virtual channel VC1 is also connected to the DMA (VC1) 110 as shown in FIG. 1.

In other words, the first buffering control unit for VC0 116 and the second buffering control unit for VC1 117 are configured such that when the PCI Express I/F 107 receives data via the first virtual channel VC0, the first buffering control unit for VC0 116 outputs the received data and when the PCI Express I/F 107 receives data via the second virtual channel VC1, the second buffering control unit for VC1 117 outputs the received data. In this embodiment, by switching on and off the switches 118 and 119, the data output from the first buffering control unit for VC0 116 is selectively written in the receive buffer for VC0 130 or the receive buffer for VC1 134. Specifically, when the selector 118 is switched on and the selector 119 is switched off, the data output from the first buffering control unit for VC0 116 is written in the receive buffer for VC0 130. On the other hand, when the selector 118 is switched off and the selector 119 is switched on, the data output from the first buffering control unit for VC0 116 is written in the receive buffer for VC1 134.

The MFP 1 further includes a clock generating circuit 121 (clock generating unit) that supplies a clock signal to each of the components via CLK lines. The clock signal output from the clock generating circuit 121 is input to the receive buffer for VC0 130 of the first virtual channel VC0 via an AND circuit 121a. Further, the clock signal output from the clock generating circuit 121 is input to the receive buffer for VC1 134 of the second virtual channel VC1.

The selectors 118 to 120, the AND circuit 121a and the register 114 function as a switching unit, for example.

Figure 6:
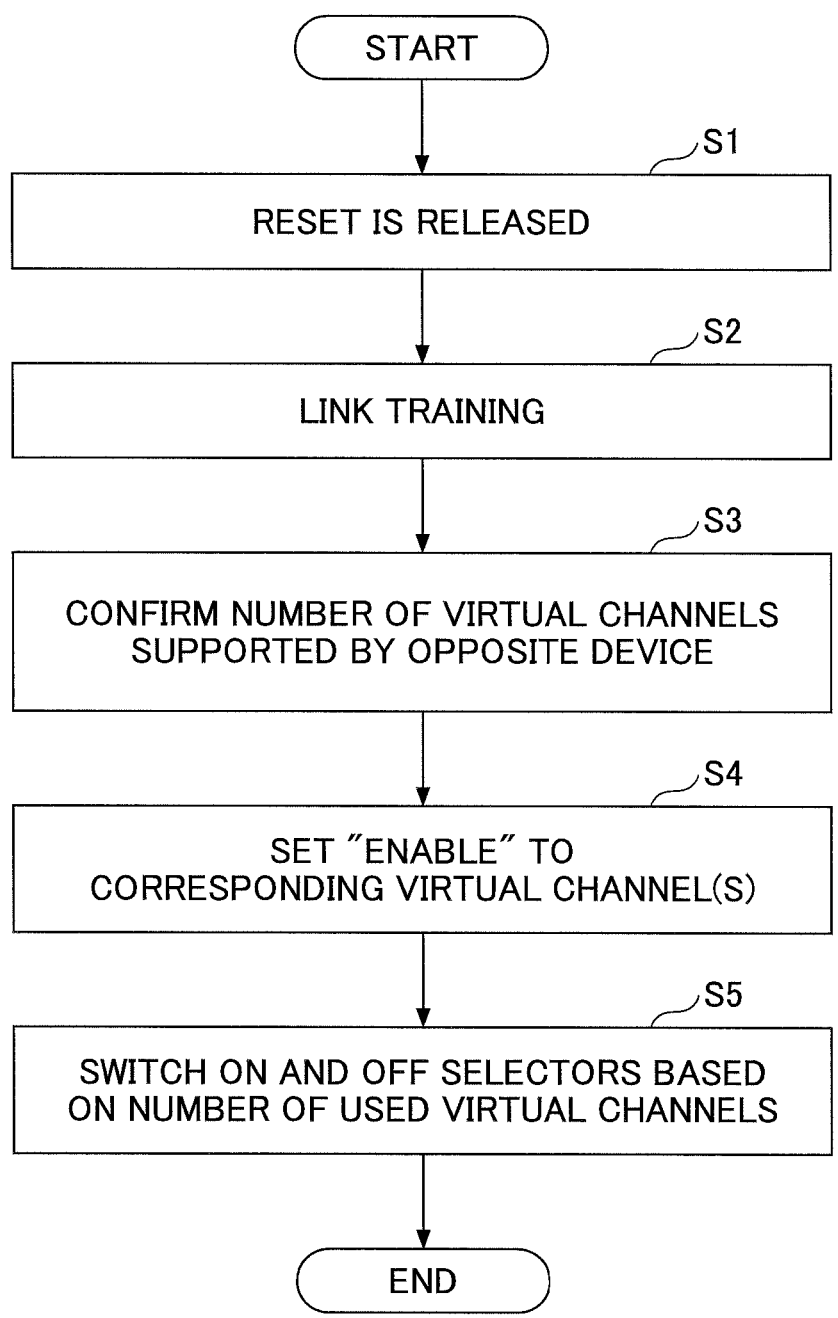
FIG. 6 is a flowchart showing a control flow of a CPU to the PCI Express I/F of the controller-side ASIC of an embodiment.

FIG. 6 is a flowchart showing a control flow of the CPU 104 to the PCI Express I/F 107 of the controller-side ASIC-B 105 of the embodiment.

When a reset between the controller-side ASIC-B 105 and the ASIC-C 115 is released (S1), the controller-side ASIC-B 105 starts link training, which is an initializing method of the PCI Express (S2).

The CPU 104 confirms the number of virtual channels supported by an opposite device, the opposite ASIC-C 115 in this case, by reading the configuration register of the Endpoint, which is the opposite ASIC-C 115 (S3).

Then, the CPU 104 sets "Enable" for the corresponding virtual channel(s) in the register 114 based on the number of the virtual channels supported by the opposite ASIC-C 115.

With this operation, data path(s) of the virtual channels formed for both of the apparatuses is established (S4). The register 114 outputs a select signal in accordance with information set in the register 114 to the selectors 118, 119 and 120, and the AND circuit 121a.

For example, when the number of the virtual channels supported by the opposite ASIC is two (VC0 and VC1), the CPU 104 sets "VC0: Enable and VC1: Enable" in the register 114. In this case, the receive buffer for VC0 130 and the receive buffer for VC1 134 which are optimized for the MFP 1 are used as they are.

However, when the number of the virtual channels supported by the opposite ASIC, such as the opposite ASIC-C 115, is one, the CPU 104 sets "VC0: Enable and VC1: Disable" in the register 114.

As described above, when the opposite ASIC-C 115 is connected to the controller-side ASIC-B 105, the controller-side ASIC-B 105 and the opposite ASIC-C 115 are connected only by the first virtual channel VC0.

Then, in this case, when the first buffering control unit for VC0 116 receives the memory read request from the opposite ASIC-C 115, the selector 118 is switched off and the selector 119 is switched on based on the select signal sent from the register 114 in accordance with the information (VC0: Enable and VC1: Disable) set in the register 114. It means that the first buffering control unit for VC0 116 is connected to the receive buffer "NPH" of the second virtual channel VC1 via the selector 119 (S5).

Similarly, the selector 120 connects the receive buffer "NPH" of the second virtual channel VC1 to the DMA (VC0) 110 instead of connecting the receive buffer "NPH" of the first virtual channel VC0 to the DMA (VC0) 110 based on the select signal sent from the register 114 in accordance with the information (VC0: Enable and VC1: Disable) set in the register 114. With this, although the first buffering control unit for VC0 116 is configured to write the data in the receive buffer "NPH" of the first virtual channel VC0 (receive buffer for VC0 130), actually, the first buffering control unit for VC0 116 writes the data in the receive buffer "NPH" of the second virtual channel VC1 (receive buffer for VC1 134) which has a sufficient capacity. Further, at this time, the clock signal output from the clock generating circuit 121 is blocked by the AND circuit 121a to which the clock signal and the select signal sent from the register 114 (VC0: Enable and VC1: Disable) are input so that the clock signal is not provided to the receive buffer "NPH" of the first virtual channel VC0, which is not used at this time. With this, power consumption can be reduced.

On the other hand, even when the opposite ASIC-C 115 is connected to the controller-side ASIC-B 105, when the first buffering control unit for VC0 116 receives the memory write request from the opposite ASIC-C 115, the selector 118 is switched on and the selector 119 is switched off so that the first buffering control unit for VC0 116 is connected to the receive buffer "PH" of the first virtual channel VC0 via the selector 118 (S5).

Figure 7:
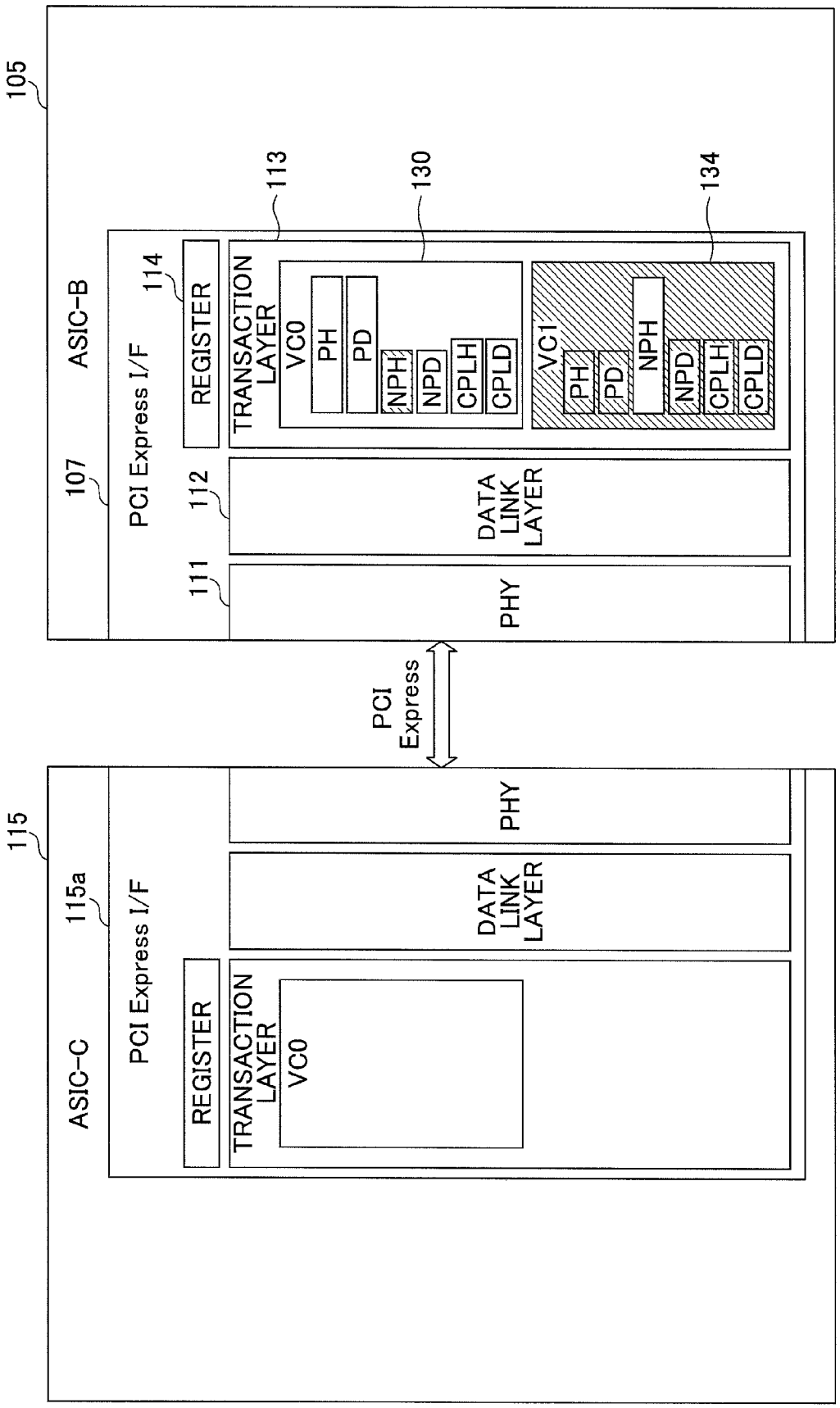
FIG. 7 is a block diagram showing an example of the PCI Express I/F of the controller-side ASIC of an embodiment.

FIG. 7 is a block diagram showing an example of the PCI Express I/F 107 of the controller-side ASIC-B 105 of the embodiment. Compared with the structure of the controller-side ASIC 205 shown in FIG. 4, by the above described switching of the selectors 118, 119 and 120 when the memory read request is received, the receive buffer "NPH" of the first virtual channel VC0 is set ineffective (parts shown by the hatched lines in FIG. 7 are not used in this example), but instead, the receive buffer "NPH" of the second virtual channel VC1 is set effective.

Further, as can be understood from FIG. 7, the receive buffer "NPH" of the second virtual channel VC1 (receive buffer for VC1 134) has the larger capacity than that of the receive buffer "NPH" of the first virtual channel VC0 (receive buffer for VC0 130). As a result, the throughput between the controller-side ASIC-B 105 and the opposite ASIC-C 115 which can only use the first virtual channel VC0 can be improved.

Specifically, in the data transmission by the first virtual channel VC0 of the PCI Express I/F 107, for the memory write request, the data is buffered by the receive buffers "PH" and "PD" of the first virtual channel VC0 (receive buffer for VC0 130), which have the sufficient capacity, and for the memory read request, the data is buffered by the receive buffer "NPH" of the second virtual channel VC1 (receive buffer for VC1 134), which has the sufficient capacity.

According to the embodiment, by using the receive buffer "NPH" of the second virtual channel VC1, which is optimized for a read access performance instead of the receive buffer "NPH" of the first virtual channel VC0 which is not supposed to be used for the read access performance, the throughput can be improved. In other words, the lowering of the throughput can be prevented. Further, at this time, as it is not necessary to increase the size of the SRAM that actualizes the receive buffers, redundant or excess SRAM is not necessarily added so that the cost is reduced. Further, the power consumption can be also reduced.

Further, although in the embodiment, it is assumed that the opposite ASIC-C 115 (Endpoint) capable of using only one virtual channel is provided to oppose the controller-side ASIC-B 105 (Root Complex) capable of using two virtual channels. However, the controller-side ASIC-B 105 may be configured to be capable of using three virtual channels. Further, the controller-side ASIC-B 105 may be configured to be capable of using three virtual channels where an opposite ASIC capable of using two virtual channels may be provided to oppose the controller-side ASIC-B 105. In such cases, similar to the embodiment, the selectors or the like may be appropriately provided and configured such that the receive buffer (flow control buffer) having an advantage in transferring data of the targeted kind of the transaction is connected.

Further, although in the embodiment, the receive buffer "NPH" is explained as an example, similarly, the receive buffer other than the receive buffer "NPH" may be configured to be connected to the first buffering control unit for VC0 116, the second buffering control unit for VC1 117 or the like by the selectors or the like. For example, when the capacity of the receive buffer "PD" or "PH" of a virtual channel which is supposed to be used is small, the PCI Express I/F may be configured to switch on a selector connected to the receive buffer "PD" or "PH" of another virtual channel whose capacity is larger while switching off a selector connected to that of the virtual channel which is supposed to be used.

Second Embodiment

In the first embodiment, an example where the connections to the receive buffers (flow control buffers) of the transaction layer 113 of the PCI Express I/F 107 of the controller-side ASIC-B 105 as the receiver-side (Rx side) are switched on and off is explained. Specifically, as the receive buffer "NPH" of the first virtual channel VC0 is optimized for the MFP 1, the corresponding capacity is set very small. On the other hand, the receive buffer "NPH" of the second virtual channel VC1 is set to have larger capacity as the receive buffer "NPH" of the second virtual channel VC1 is also optimized for the MFP 1. Thus, when the data related to the memory read request is supposed to be transmitted via the first virtual channel VC0, the receive buffer "NPH" of the second virtual channel VC1 is used instead of the receive buffer "NPH" of the first virtual channel VC0. In other words, even for the data transmission by the first virtual channel VC0, the receive buffer "NPH" of the second virtual channel VC1 is selected to be used when the data is related to the memory read request.

In the second embodiment, the same function is performed for the send buffers. In other words, an example where the connections to the send buffers (transmit buffers) of a transaction layer of a PCI Express I/F at the sender-side (Tx side) of the controller-side ASIC-B 105 are switched on and off is explained in the second embodiment.

(System Structure)

Figure 8:
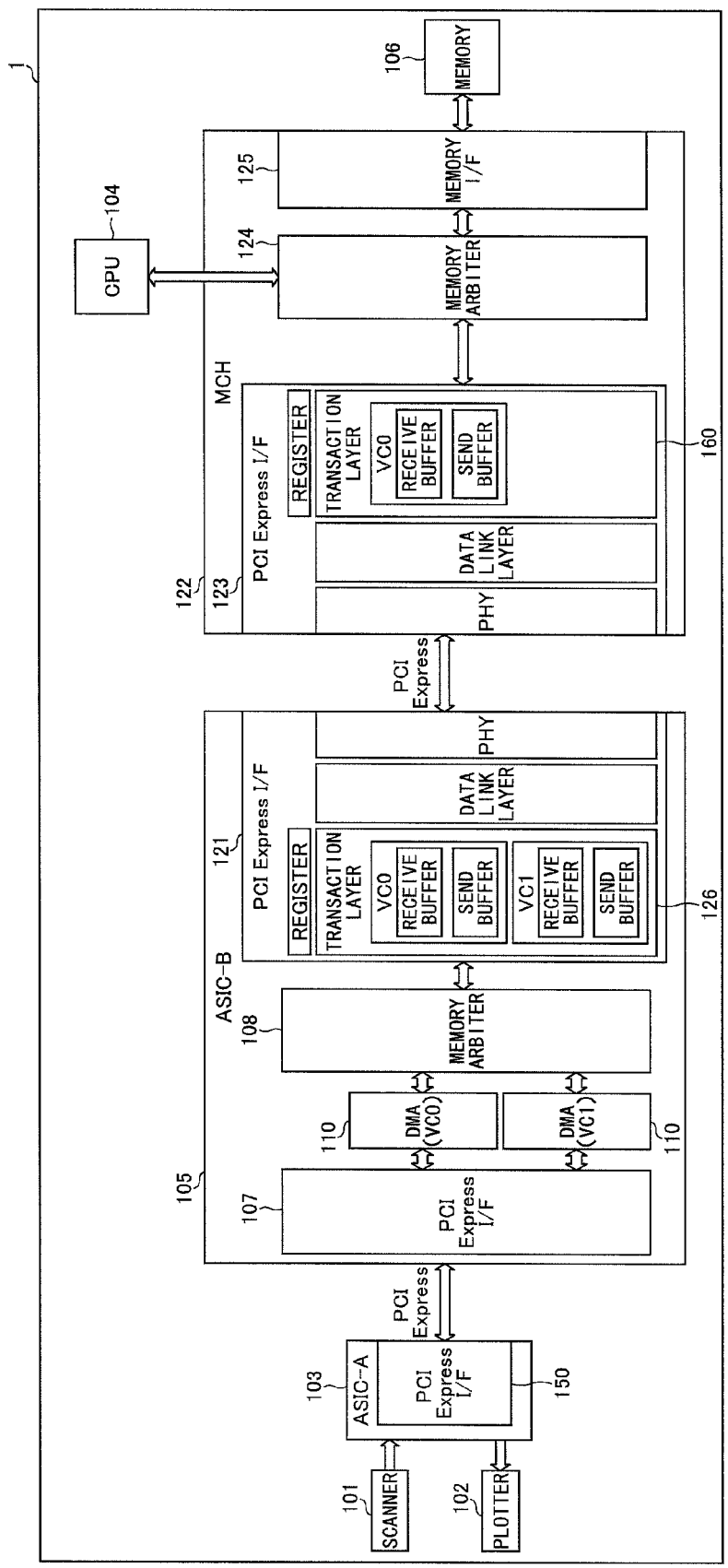
FIG. 8 is a block diagram showing an example of a structure of a PCI Express system of an embodiment.

FIG. 8 is a block diagram showing an example of a structure of a PCI Express system of the second embodiment which is embedded in the MFP 1 as an example of an embedded system. Compared with the structure shown in FIG. 1, the MFP 1 further includes a Memory Controller Hub (MCH) 122 provided between the controller-side ASIC-B 105, and the CPU 104 and the memory 106. The MCH 122 includes a PCI Express I/F (circuit) 123 (which is an example of a virtual channel unit).

The controller-side ASIC-B 105 of the embodiment includes a PCI Express I/F (circuit) 121 instead of the memory I/F 109 compared with the controller-side ASIC-B 105 of the first embodiment shown in FIG. 1.

Thus, data from the scanner 101 and the plotter 102 are sent to the memory 106 via the opposite ASIC-A 103, the controller-side ASIC-B 105 and the MCH 122, which are connected with each other by the PCI Express I/F 150, the PCI Express I/F 107, the PCI Express I/F 121 and the PCI Express I/F 123.

The PCI Express I/F 121 has a structure similar to that of the PCI Express I/F 107. The PCI Express I/F 121 includes a physical layer (shown as "PHY"), a data link layer, a transaction layer 126 and a register.

The PCI Express I/F 121 is configured to form two virtual channels including the first virtual channel VC0 and the second virtual channel VC1. It means that the transaction layer 126 includes a send buffer for VC0 and a send buffer for VC1 in addition to a receive buffer for VC0 and a receive buffer for VC1. These send buffers (the send buffer for VC0 and the send buffer for VC1) are used to queue data to be transferred when issuing a request for the MCH 122, under a state where the controller-side ASIC-B 105 is the sender and the MCH 122 is the receiver.

In addition to the PCI Express I/F 123, the MCH 122 includes a memory arbiter 124 and a memory I/F 125.

In this embodiment, it is assumed that the MCH 122 is capable of using only the first virtual channel VC0. As described in the first embodiment, as for the PCI Express, the data transfer apparatuses are connected by the maximum number of the virtual channels which are supported by both of the data transfer apparatuses. Thus, in this case, the controller-side ASIC-B 105 and the MCH 122 are connected only by the first virtual channel VC0.

Figure 9:
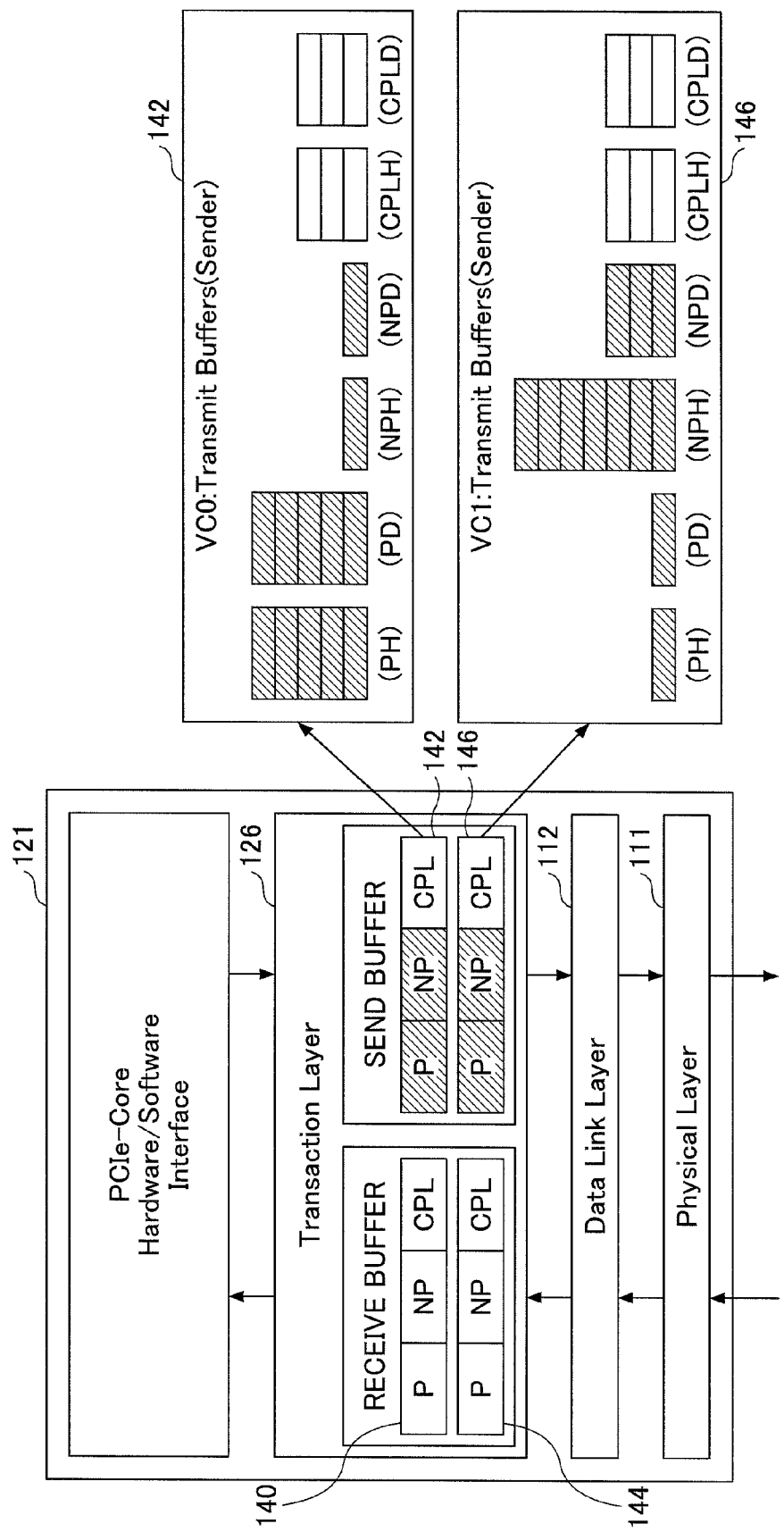
FIG. 9 is a schematic view showing an example of architecture of a PCI Express I/F of a controller-side ASIC of an embodiment.

FIG. 9 is a schematic view showing an example of architecture of the PCI Express I/F 121 of the second embodiment. Similar to the transaction layer 113 of the PCI Express I/F 107 shown in FIG. 2, the transaction layer 126 of the PCI Express I/F 121 is configured to include a receive buffer for VC0 140, a receive buffer for VC1 144, a send buffer for VC0 142 and a send buffer for VC1 146. In FIG. 9, the contents of the send buffer for VC0 142 and the send buffer for VC1 146 are shown in detail.

As shown in FIG. 9, similar to the receive buffers, the send buffers are respectively formed for the kinds of transactions which are supposed to flow through the virtual channels. Further, as data is transferred as packet data in the data communications by the PCI Express, each of the buffers is further formed to include a header portion for buffering a header including packet information or the like, and a data portion for buffering a payload of the packet.

Thus, each of the receive buffer for VC0 140, the receive buffer for VC1 144, the send buffer for VC0 142 and the send buffer for VC1 146 includes the following six buffers "PH", "PD", "NPH", "NPD", "CPL" and "CPD".

Further, similar to the receive buffers as shown in FIG. 2, the capacities of the send buffers corresponding to the kinds of transactions are not the same and are optimized for the function of the MFP 1. Thus, the capacity of some kinds of the send buffers of a virtual channel is larger than that of another virtual channel, and on the other hand, the capacity of some kinds of the send buffers of the former virtual channel is smaller than that of the latter other virtual channel.

For example, referring to the content of the send buffer for VC0 142, the send buffers for the "posted transaction" ("PH" and "PD") have a larger capacity than those of the send buffers for the "non-posted transaction" ("NPH" and "NPD"), respectively. For the MFP 1, as described above, the first virtual channel VC0 is adapted for the transactions related to inputs by the scanner 101.

Thus, in the controller-side ASIC-B 105, the receive buffer for VC0 130 of the PCI Express I/F 107 (see FIG. 2) mainly receives the memory write request from the scanner 101, and then, the send buffer for VC0 142 of the PCI Express I/F 121 mainly sends the received memory write request to the MCH 122. Therefore, in the PCI Express I/F 121, the first virtual channel VC0 is configured to have a larger capacity for the send buffer for the "posted transaction" in order to sufficiently send the memory write request.

Further, referring to the content of the send buffer for VC1 146, the send buffers for the "non-posted transaction" ("NPH" and "NPD") have larger capacities than those of the send buffers for the "posted transaction" ("PH" and "PD"), respectively. For the MFP 1, as described above, the second virtual channel VC1 is adapted for the transactions related to an output by the plotter 102.

Thus, in the controller-side ASIC-B 105, the receive buffer for VC1 134 of the PCI Express I/F 107 (see FIG. 2) mainly receives the memory read request from the plotter 102, and then, the send buffer for VC1 146 of the PCI Express I/F 121 mainly sends the received memory read request to the MCH 122. Therefore, in the PCI Express I/F 121, the second virtual channel VC1 is configured to have a larger capacity for the send buffer for the "non-posted transaction" in order to sufficiently send the memory read request.

Figure 10:
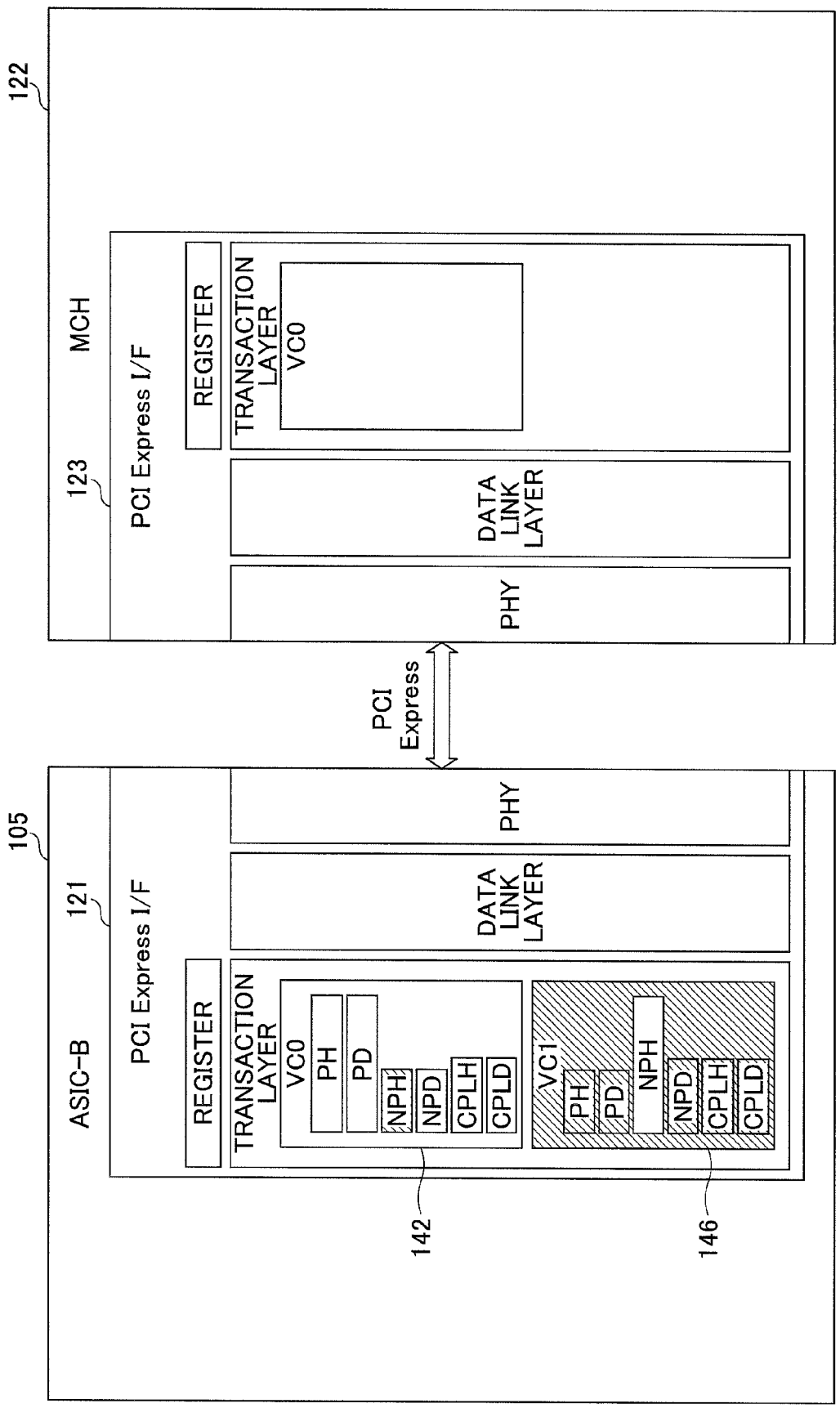
FIG. 10 is a block diagram showing an example of the PCI Express I/F of the controller-side ASIC of an embodiment.

FIG. 10 is a block diagram showing an example of the PCI Express I/F 121 of the controller-side ASIC-B 105 of the embodiment. As described above, in the second embodiment, the connections to the send buffers (transmit buffers) of the transaction layer 126 of the PCI Express I/F 121 at the sender-side (Tx side) of the controller-side ASIC-B 105 are switched on and off in the second embodiment. As described above, the capacity of the send buffer "NPH" of the first virtual channel VC0 (send buffer for VC0 142) is set smaller as it is optimized for the MFP 1. On the other hand, the send buffer "NPH" of the second virtual channel VC1 (send buffer for VC1 146) is set larger as it is optimized for the MFP 1.

Although not shown in the drawings, the PCI Express I/F 121 of the controller-side ASIC-B 105 has a structure similar to that of the PCI Express I/F 107 explained above with reference to FIG. 5. Thus, even when the data is transferred using only the first virtual channel VC0, the send buffer "NPH" of the second virtual channel VC1 is used instead of the send buffer "NPH" of the first virtual channel VC0 when the memory read request is sent.

Thus, as shown in FIG. 10, by the switching of selectors (not shown in the drawings) similar to the selectors 118, 119 and 120 of the PCI Express I/F 107, when the memory read request is to be sent, the send buffer "NPH" of the first virtual channel VC0 is set to ineffective (parts shown by the hatched lines in FIG. 10 are not used in this example), but instead, the send buffer "NPH" of the second virtual channel VC1 is set to effective.

Further, as can be understood from FIG. 10, the send buffer "NPH" of the second virtual channel VC1 (send buffer for VC1 146) has the larger capacity than that of the send buffer "NPH" of the first virtual channel VC0 (send buffer for VC0 142). As a result, the throughput between the controller-side ASIC-B 105 and the opposite MCH 122 which can only use the first virtual channel VC0 can be improved.

Specifically, in the data transmission by the first virtual channel VC0 of the PCI Express I/F 121, for the memory write request, the data is buffered by the send buffers "PH" and "PD" of the first virtual channel VC0 (send buffer for VC0 142), which have the sufficient capacity for queuing the data; and for the memory read request, the data is buffered by the receive buffer "NPH" of the second virtual channel VC1 (send buffer for VC1 146), which has the sufficient capacity.

According to the embodiment, by using the send buffer "NPH" of the second virtual channel VC1, which is optimized for read access performance instead of the send buffer "NPH" of the first virtual channel VC0 which is not supposed to be used for the read access performance, the throughput can be improved. In other words, the lowering of the throughput can be prevented. Further, at this time, since it is not necessary to increase the size of the SRAM that actualizes the send buffers, redundant or excess SRAM is not necessarily added so that the cost is reduced. Further, the power consumption can be also reduced.

Further, although the PCI Express I/F (107, 121, 123, 150 or 115) of the embodiments is assumed to include both of the receive buffer and the send buffer, the PCI Express I/F (107, 121, 123, 150 or 115) may be configured to include only one of the receive buffer and the send buffer. For example, the PCI Express I/F 107 of the controller-side ASIC-B 105, which is provided as the receiver-side PCI Express I/F, may be configured not to include the send buffers. Further, the PCI Express I/F 121 of the controller-side ASIC-B 105, which is provided as the sender-side PCI Express I/F, may be configured not to include the receiver buffers.

According to the embodiment, a data transfer apparatus and an image forming system capable of improving throughput in transferring data via a virtual channel with another data transfer apparatus without increasing cost or power consumption regardless of the kind of the other data transfer apparatus are provided.

The present invention is not limited to the specifically disclosed embodiments, and variations and modifications may be made without departing from the scope of the present invention.

The present application is based on Japanese Priority Application No. 2011-157182 filed on Jul. 15, 2011, the entire contents of which are hereby incorporated herein by reference.

What is claimed is:
1. A data transfer apparatus comprising:
   a virtual channel unit configured to time share a serial bus for a first virtual channel and a second virtual channel and include a buffering control unit configured to receive data via the first virtual channel and the second virtual channel, a first receive buffer configured to store the data received via the first virtual channel, and a second receive buffer configured to store the data received via the second virtual channel;

a switching unit configured to control storing of the data received via the first virtual channel in the second receive buffer when the buffering control unit receives the data from another data transfer apparatus which is configured to use only the first virtual channel and the capacity of the first receive buffer provided to store the data is smaller than the capacity of the second receive buffer provided to store the data; and a clock generating unit that generates a clock signal to be supplied to the first receive buffer and the second receive buffer, and wherein the switching unit is configured to block supplying of the clock signal to the first receive buffer when controlling storing of the data received via the first virtual channel in the second receive buffer.

2. The data transfer apparatus according to claim 1, wherein the first receive buffer and the second receive buffer are respectively provided with plural receive buffers corresponding to plural kinds of transactions to be received by the buffering control unit for the first receive buffer and the second receive buffer, respectively, and the switching unit is configured to control storing of the data of one of the kinds of transactions received via the first virtual channel in the second receive buffer when the buffering control unit receives the data from the other data transfer apparatus which is configured to use only the first virtual channel and the capacity of the receive buffer for the one of the kinds of transactions of the first receive buffer is smaller than that of the second receive buffer.

3. The data transfer apparatus according to claim 1, wherein the first receive buffer and the second receive buffer are flow control buffers defined by a PCI Express standard, the virtual channel unit further includes a reporting unit that reports, before the buffering control unit receives the data via the first virtual channel from the other data transfer apparatus which is configured to use only the first virtual channel, information related to vacant capacity of the second receive buffer provided to store the data when the capacity of the first receive buffer provided to store the data is smaller than the capacity of the second receive buffer provided to store the data.

4. A data transfer apparatus comprising:

a virtual channel unit configured to time share a serial bus for a first virtual channel and a second virtual channel and include a buffering control unit configured to send data via the first virtual channel and the second virtual channel, a first send buffer configured to store the data to be sent via the first virtual channel, a second send buffer configured to store the data to be sent via the second virtual channel;

a switching unit configured to control storing of the data to be sent via the first virtual channel in the second send buffer when the buffering control unit sends the data to another data transfer apparatus which is configured to use only the first virtual channel and the capacity of the first send buffer provided to store the data is smaller than the capacity of the second send buffer provided to store the data; and a clock generating unit that generates a clock signal to be supplied to the first send buffer and the second send buffer, and wherein the switching unit is configured to block supplying of the clock signal to the first send buffer when controlling storing of the data to be sent via the first virtual channel in the second send buffer.

5. The data transfer apparatus according to claim 4, wherein the first send buffer and the second send buffer are respectively provided with plural send buffers corresponding to plural kinds of transactions to be sent by the buffering control unit for the first send buffer and the second send buffer, respectively, and the switching unit is configured to control storing of the data of one of the kinds of transactions to be sent via the first virtual channel in the second send buffer when the buffering control unit sends the data to the other data transfer apparatus which is configured to use only the first virtual channel and the capacity of the send buffer for the one of the kinds of transactions of the first send buffer is smaller than that of the second send buffer.

6. An image forming system comprising:

an image input engine;

an image output engine; and a controller that controls the image input engine and the image output engine and connects the image input engine and the image output engine, the controller including a data transfer apparatus including, a virtual channel unit configured to time share a serial bus for a first virtual channel and a second virtual channel and include a buffering control unit configured to receive data via the first virtual channel and the second virtual channel, a first receive buffer configured to store the data received via the first virtual channel, and a second receive buffer configured to store the data received via the second virtual channel, the first receive buffer and the second receive buffer being respectively provided with plural receive buffers corresponding to plural kinds of transactions to be received by the buffering control unit for the first receive buffer and the second receive buffer, respectively, and a switching unit configured to control storing of the data received via the first virtual channel in the second receive buffer when the buffering control unit receives the data from another data transfer apparatus which is configured to use only the first virtual channel and the capacity of the first receive buffer provided to store the data is smaller than the capacity of the second receive buffer provided to store the data, and the switching unit being configured to control storing of the data of one of the kinds of transactions received via the first virtual channel in the second receive buffer when the buffering control unit receives the data from the other data transfer apparatus which is configured to use only the first virtual channel and the capacity of the receive buffer for the one of the kinds of transactions of the first receive buffer is smaller than that of the second receive buffer, wherein the first receive buffer and the second receive buffer are configured such that the capacity of the receive buffer of the first receive buffer corresponding to a transaction related to an image input by the image input engine is larger than the capacity of the receive buffer of the second receive buffer corresponding to the transaction related to the image input by the image input engine, and the capacity of the receive buffer of the first receive buffer corresponding to a transaction related to an image output by the image output engine is smaller than the capacity of the receive buffer of the second receive buffer corresponding to the transaction related to the image output by the image output engine, and the switching unit is configured to control storing of the data of the transaction related to the image output by the image output engine received via the first virtual channel in the receive buffer of the second receive buffer corresponding to the transaction related to the image output by the image output engine.

* * * * *